United States Patent [19]

Abbey

[11] Patent Number: 5,430,770
[45] Date of Patent: Jul. 4, 1995

[54] METHOD AND APPARATUS FOR COMPOSITE SIGNAL SEPARATION AND PSK/AM/FM DEMODULATION

[75] Inventor: Duane L. Abbey, Cedar Rapids, Iowa

[73] Assignee: Rockwell International Corp., Seal Beach, Calif.

[21] Appl. No.: 232,552

[22] Filed: Apr. 22, 1994

[51] Int. Cl.[6] ............................................. H04B 1/10
[52] U.S. Cl. .................................. 375/349; 375/346
[58] Field of Search ................. 375/58, 80, 81, 82, 375/94, 99, 102, 98; 329/307, 308, 316

[56] References Cited

U.S. PATENT DOCUMENTS

| | | | |
|---|---|---|---|
| 4,222,051 | 9/1980 | Kretschmer, Jr. | 343/100 |
| 4,388,730 | 6/1983 | Nash et al. | 455/208 |
| 4,457,007 | 6/1984 | Gutleber | 375/102 |
| 4,547,737 | 10/1985 | Gibson | 329/50 |
| 4,620,160 | 10/1986 | Waggener | 329/104 |
| 4,683,578 | 7/1987 | Betts et al. | 375/98 |
| 4,736,392 | 4/1988 | Kammeyer et al. | 375/80 |
| 4,910,468 | 3/1990 | Ohtsuka et al. | 329/316 |
| 4,910,469 | 3/1990 | Takahashi | 329/320 |
| 5,065,107 | 11/1991 | Kumar et al. | 329/308 |
| 5,179,360 | 1/1993 | Suzuki | 329/316 |

Primary Examiner—Stephen Chin
Assistant Examiner—Huong Luu
Attorney, Agent, or Firm—Kyle Eppele; M. Lee Murrah; H. F. Hamann

[57] ABSTRACT

A composite signal recognizer separator, and PSK, AM, FM demodulator apparatus for processing received communication signals. The receiver utilizes N demodulators cascadely-coupled, where N is equal to or greater than the number of co-channel signals or perceived interference. Detailed in both dual and single stages cascaded fashion, the receiver first tracks to a predominant (stronger) signal, and regeneratively improves track on other (weaker) signals by subtracting predominant noise portion from the input of further demodulation stages. A unified approach to PSK carrier phase tracking, character data tracking, and recovery clock tracking is utilized.

9 Claims, 6 Drawing Sheets

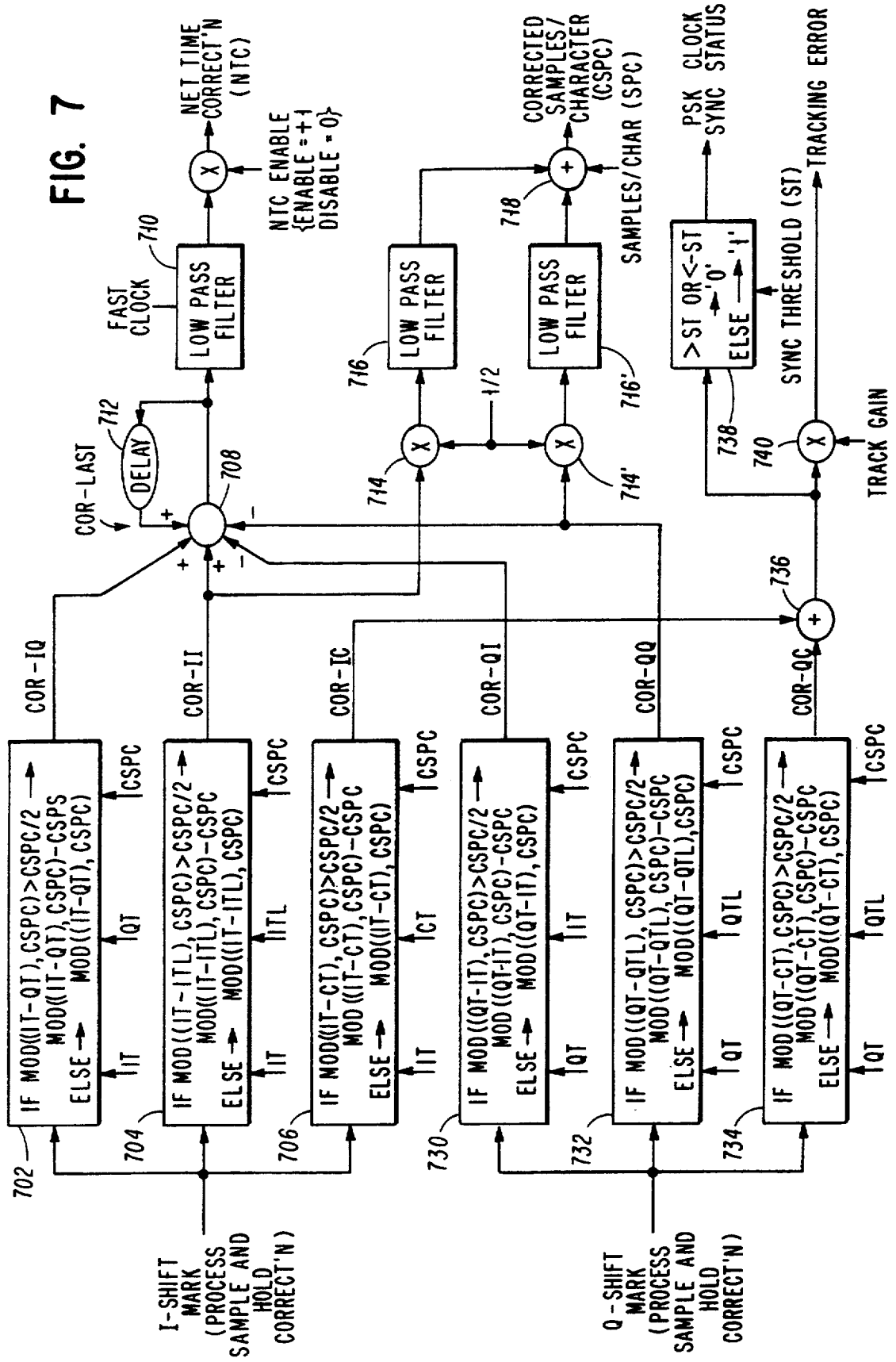

METHOD AND APPARATUS FOR COMPOSITE SIGNAL SEPARATION AND PSK/AM/FM DEMODULATION

BACKGROUND OF THE INVENTION

This invention relates to systems for receiving voice and data signals and, more particularly, to the detection of composite signals in such systems.

The present application is related to copending application Ser. No. 08/231,566 filed on the same date as this application, entitled, "Method And Apparatus For Composite Signal Separation And FM Demodulation", by inventor Duane L. Abbey, attorney docket number 92CR037/KE, incorporated herein by reference.

A variety of apparatus and techniques currently exist for processing FM signals in communication systems. In those situations in which the signal-of-interest has co-channel interference or more than one co-channel signal is desired, prior art solutions to such instances generally require duplicative equipment and increased processing time.

A typical receiver is comprised of one or more phase-locked loops (PLL) that may include fixed signal limits. The PLL may take the form of an analog or digital implementation, depending upon design choice and available resources. Generally, a PLL is dedicated to suppress noise by locking to the signal. The PLL contains a voltage-controlled oscillator, whose output could be multiplied with the input signal and integrated to establish a relative measure of noise level in the input signal. Additional PLLs may be included that are bandwidth tailored for the specific demodulation scheme desired. Some such systems may include a threshold (or thresholds) above which the detected noise level will cause the output to be squelched.

Generally, phase modulation is limited to data modulation signals (PSK) because coherent carrier recovery is next to impossible for non-predictable phase reference signals. The two main types of PSK demodulators used are coherent (carrier tracking) demodulators and non-coherent (differential phase change) demodulators. Of the two types, coherent demodulation provides superior noise performance as long as carrier phase synchronism is maintained.

One type of coherent PSK demodulator uses a signal squaring circuit (BPSK) or signal squaring circuit pair in cascade (QPSK) to recover a continuous carrier and a PLL to reduce the frequency back to the transmit frequency. The recovered carrier can be multiplied by the input signal to recover the transmitted data. This approach does have an initial phase ambiguity problem that can require multiple demodulators and recovered carrier offsets to resolve.

A more common type of coherent PSK demodulator uses a demodulated data remodulator PLL. This type of demodulator in its most common form is called a Costas loop. Basically the demodulated data is remodulated with the modulated data signal to recover the carrier. If the recovered carrier is in synchronism, the data will have been demodulated correctly (assuming good S/N). The remodulation phase locked loop seeks to maintain recovered data integrity and thereby maintain carrier synchronism. This approach also has an initial phase ambiguity problem, e.g. a QPSK loop can have the I channel output locked on to any of the following, I modulation signal, −I modulation signal, Q modulation signal, and the −Q modulation signal.

Co-channel noise and interference of sufficient amplitude can quickly break carrier phase synchronism and cause loss of data in either coherent demodulator approach. If the transmitted data was not differentially encoded, the whole data transmission could be lost from a single momentary loss of phase synchronism.

Accordingly, there exists a need for an improved composite signal separator and demodulator capable of handling a wide array of received signals. The demodulator needs to be able to reliably recover PSK data without loss of carrier phase synchronism.

SUMMARY OF THE INVENTION

A signal processing apparatus and method of demodulating angle-modulated communication signals and suppressing co-channel interference and multi-path distortion is disclosed. An input signal is routed through phase-offset removal means coupled to demodulator means. The demodulator means is comprised of a plurality of demodulator stages. The demodulator stages are cascadely-coupled to each other, with the first demodulator stage and last n (where n equals the number of co-channel signals) demodulator stages consisting of dual phase-locked loop (PLL) stages. The intervening stages are single PLL stages. Each demodulator stage has its output coupled to means for performing signal recognition and means for accomplishing demodulator control. Each dual PLL demodulator stage also has its output coupled through selection means to a common means for character data, character timing, and carrier phase coherency processing on the identified signal.

It is therefore and object of the present invention to provide an apparatus for accomplishing composite communication signal processing.

It is a feature of the present invention that the disclosed apparatus includes a plurality of demodulator stages, some of which contain dual PLLs.

It is an advantage of the present invention that an input signal having co-channel interference and being angle modulated can be quickly processed to suppress noise and interference as contrasted to prior art techniques.

It is a further advantage of the present invention that a variety of signal types can be demodulated and recovered, including AM and FM analog signals; BPSK, QPSK, and offset QPSK data signals; and ASK and FSK data signals.

The foregoing, as well as other objects, features and advantages of the present invention will become better understood from the following detailed description taken in conjunction with the various views of the appended drawings.

BRIEF DESCRIPTION OF THE DRAWINGS

FIG. 7 is a block diagram of the error process section of the timing and phase correction means of the apparatus of FIG. 1.

DETAILED DESCRIPTION OF THE DRAWINGS

Figure 1:
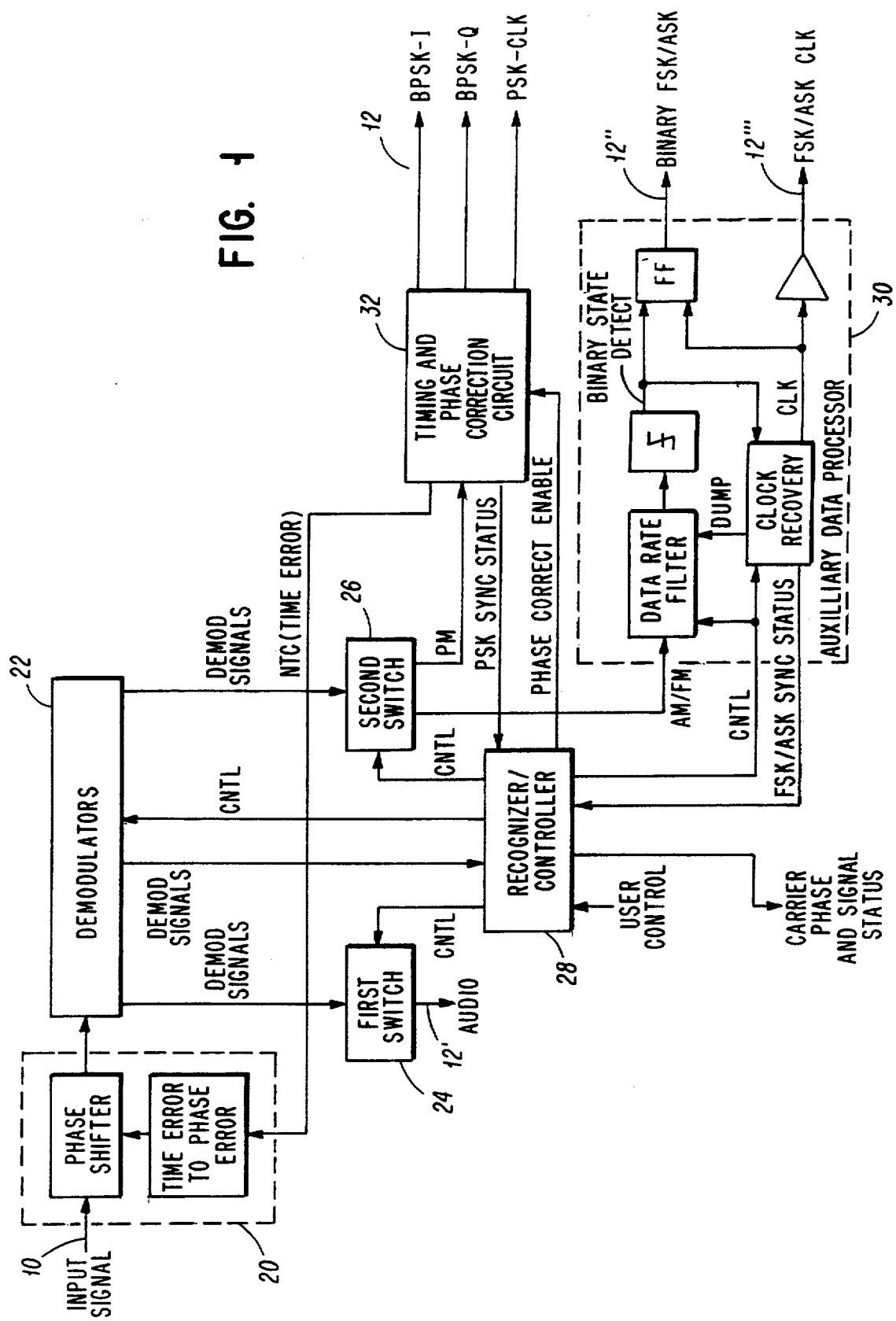
FIG. 1 is a block diagram of a portion of a receiver apparatus capable of incorporating the teachings of the present invention.

Turning now to the drawings, wherein like items are referred to as such throughout, FIG. 1 illustrates a block diagram of a portion of an apparatus for processing an input signal 10 to desired output signals 12, 12', 12", 12'''. The input signal 10 is understood to be representative of an I component (in-phase) and a Q component (quadrature-phase) and passes through means for removing phase offset 20 into demodulator means 22. The demodulator means 22 has certain output signals coupled to first and second switches 24, 26, and to recognizer-controller 28. The switches 24, 26 are also coupled to the recognizer-controller 28. The recognizer-controller 28 is coupled to FSK/ASK processor 30 as is the switch 26. Likewise the recognizer-controller 28 and switch 26 are coupled to timing and phase corrector 32 for processing PSK signals.

The above described apparatus operates in principle by receiving in-phase and quadrature signal components, performing phase-offset correction and signal demodulation. The signal recognizer identifies desired data signals and routes such signals to the PSK and FSK/ASK processing means via the second switch 26. Alternatively, desired analog (audio) signals are switched on to additional processing means (not shown) via the first switch 24. Specific details of one embodiment are here-in-after provided.

Figure 2:
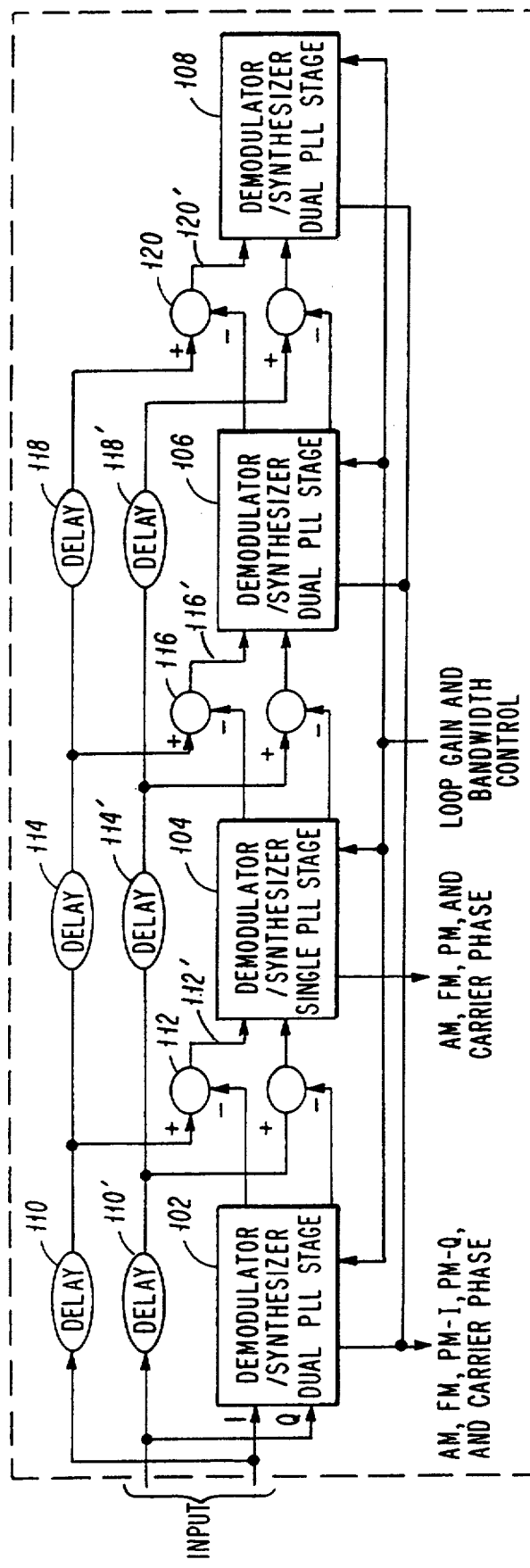
FIG. 2 is a block diagram of one implementation of the demodulator apparatus of FIG. 1.

In FIG. 2, the demodulator 22 of FIG. 1 is detailed. A plurality of demodulator/synthesizer stages 102, 104, 106 and 108 are cascadely-coupled with a plurality of delayers 110, 110', 114, 114', 118, 118' and signed summers 112, 112', 116, 116', 120, 120'. Although shown as having four stages it is understood that the number of stages is somewhat arbitrary to practice the teachings of the present invention.

A minimum number N, equal in value to the total number M of signals, interference or noise desired to be processed is required. More optimum performance is achieved when N=gM, where g is the number of cascaded groups of M demodulator/synthesizers. As the value of g is increased, signal separation performance is improved. When M is greater than 2 signals, the signed summers (112, 116, 120, etc.) must combine additional prior stage synthesized outputs, delayed to compensate for the intervening stage(s) process delays. For example, when M=2 signals, the prior stage outputs are subtracted (as shown in FIG. 2). When M=3 signals, the two prior stages outputs are subtracted. In general, when M signals are separated, the prior 'M−1' synthesized output pairs must be appropriately delayed and subtracted from the delayed input signal. Also, the desired demodulation signal outputs can come from any of the first stage and last 'M' stages.

Furthermore, the first and last 'M' stages are required to have dual PLL stages. The other stages can be single PLL stages as they are not required to process I and Q channels separately.

The apparatus as shown in FIG. 2 is best suited for one single-of-interest and one interfering signal (g=2, M=2). The cascadely-coupled demodulators track or "lock on" to a predominant signal, which is processed or cleaned up, then is subsequently removed or subtracted by signed summers 112, 112' from delayers 110, 110'. This processing scheme continues in a regenerative fashion (each successive group improving the component signals separation) through the demodulators 104, 106 and 108. The output signals representative of AM, FM, PM-I, PM-Q and carrier phase are coupled to various additional means as shown in FIG. 1. The single PLL stage demodulator(s) output is only coupled to additional demodulator stage(s) and recognizer-controller 28.

Figure 3:
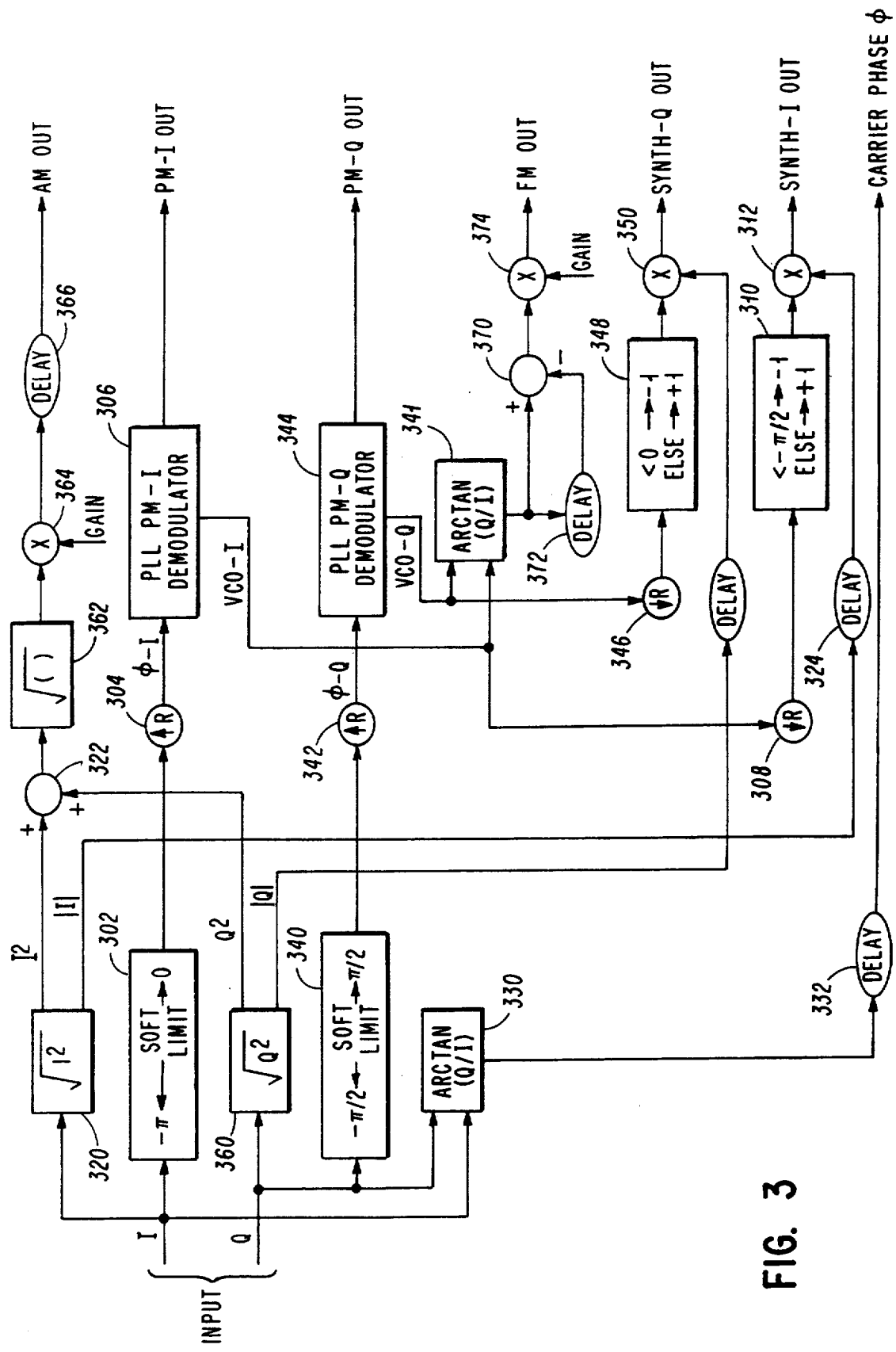
FIG. 3 is a block diagram of one implementation of the dual phase-locked loop demodulator stage of the apparatus of FIG. 2.

FIG. 3 is a block diagram of a demodulator stage having a dual phase-locked loop, such as demodulator 102. The duality of the demodulator is used to dedicate one channel and corresponding PLL to the in-phase I component signal and the other channel to the quadrature Q component signal. The I component input signal is shown coupled through an amplitude to phase normalizer (soft limiter) 302, a sample rate increaser 304 and into a demodulator PLL 306. A demodulated I channel phase modulation signal PM-I is made available for additional processing by the timing and phase corrector 32 as shown in FIG. 1. A synthesized output signal VCO-I is routed through a sample rate reducer 308, through a limiter 310 and through a multiplier 312 to yield a cleaned-up synthesized I component output signal Synth-I. The I input signal is also routed through squaring means 320 that squares the I component and passes the square of such signal to summer 322. The absolute value of the I component is also extracted at squaring means 320 and routed to the multiplier 312 via delayer 324. The I input signal is also routed through means for performing an arctangent operation 330, through delayer 332 and on for additional processing as determined by the recognizer-controller 28 of FIG. 1. The VCO-I signal is similarly routed through an arctangent means 341, through a single sample differentiator (signed summer 370 and sample delay 372), and through a gain multiplier 374 resulting in a demodulated FM output signal.

In a similar fashion to the above described I component signal, the Q component signal is processed through the Q channel having similar components to the I channel. A second demodulator 344 provides a PM-Q output signal and a synthesized signal VCO-Q. The dual PLL demodulator stage is shown processing sampled signals, although the approach applies equally well to continuous signals (no sample rate adjustment 304, 342, 346, 308). For sampled signals, the rate adjust value R is typically two but may be more or less.

In operation, the I and Q inputs are converted to soft limited phase information, positive I and Q limits to 0 and +90 degrees respectively and negative I and Q limits to −180 and −90 degrees respectively. The soft limiting is a gain stage prior to limiting, optimized for the signal rise time. The detected phase modulation is the filtered output of each PLL. The phase shifter of FIG. 1 aligns the input signal such that QPSK signals can be separated into non-interfering I and Q channels for independent BPSK demodulation. The phase-locked VCO outputs are filtered by the loops and used to demodulate FM and synthesize the processed I and Q outputs. The synthesized outputs are subtracted from the received I and Q signals to form the next demodulator stage input as shown in FIG. 2. In this way the signal locked onto by a prior stage is suppressed from the input to latter demodulation stages, which enhances their ability to lock onto a weaker signal.

Figure 4:
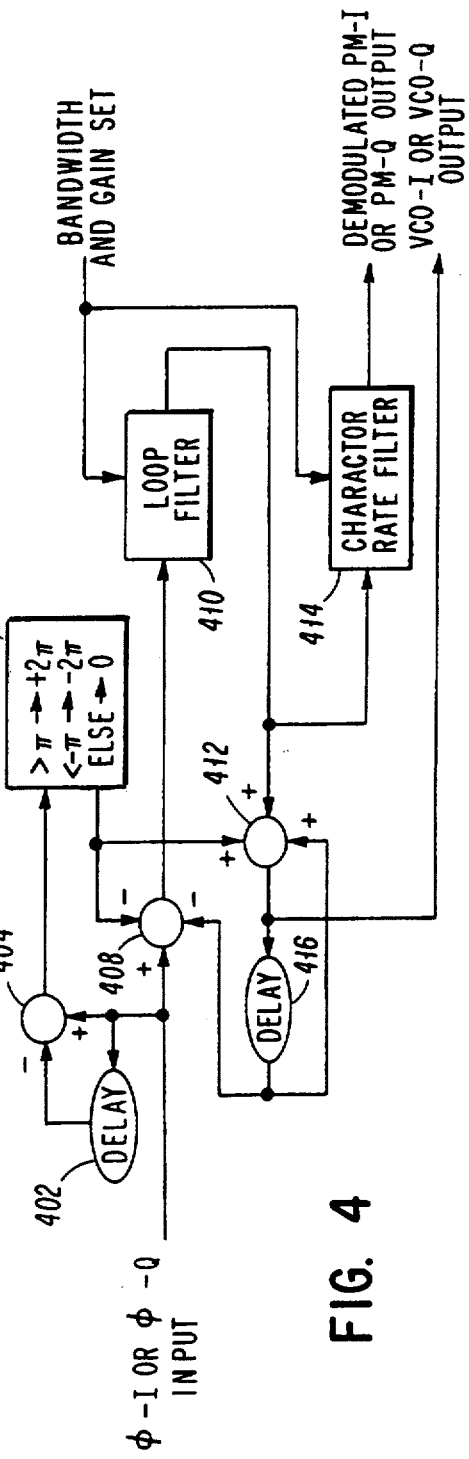
FIG. 4 is a block diagram of one implementation of the phase-locked loops of the apparatus of FIG. 3.

FIG. 4 illustrates a block diagram of a PLL demodulator stage comprising one channel of the dual demodulator stage, such as 306. The input signal angle (either the I or Q signal component) is coupled through delayer 402, a signed summer 404, a phase roll over detector 406, and a second signed summer 408. The output of the signed summer 408 is routed through a loop filter 410, and on to either an additional summer 412 or a character rate filter 414. The output of the summer 412 is routed through delayer 416 as shown in FIG. 4. The phase detector is signed summer 408 which provides phase difference information between the input and the VCO. The VCO is the adder 412 output which is a phase accumulator or a DC frequency oscillator. The top signed summer 404 is used to detect phase roll over and pass the roll over condition around the loop filter, thereby precluding phase discontinuity noise generation.

Figure 5:
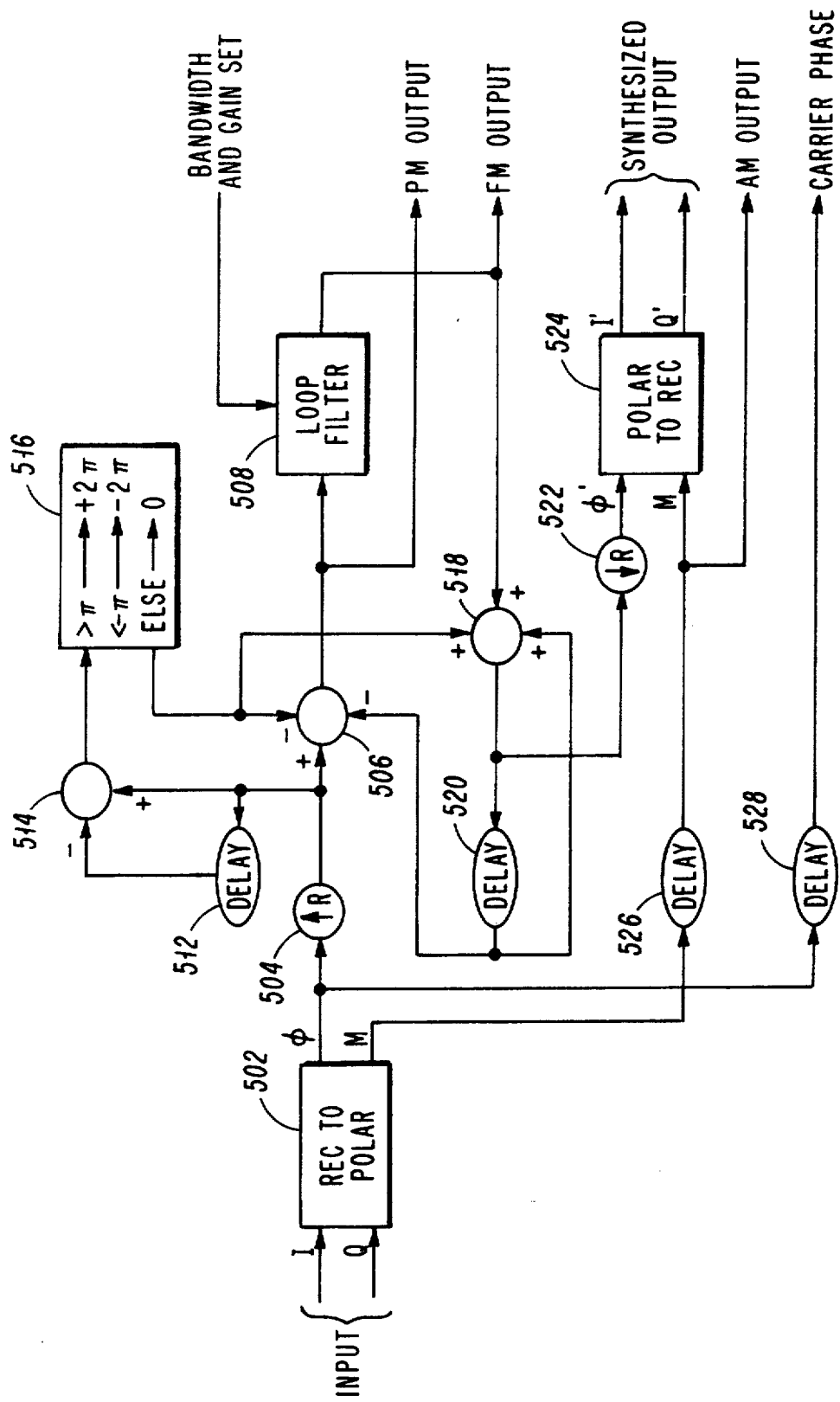
FIG. 5 is a block diagram of one implementation of the single phase-locked loop demodulator stage of the apparatus of FIG. 2.

FIG. 5 illustrates a single PLL demodulator stage such as 104 (see FIG. 2) in block diagram form. The input signal is shown having an I component and a Q component coupled to means for performing rectangular-to-polar conversion 502. The output of means 502 are shown as M representing magnitude and $\phi$ representing phase. The $\phi$ signal is coupled through delayer 528 and output to recognizer-controller 28 (see FIGS. 1 and 2) as carrier phase $\phi$. The $\phi$ signal is also coupled to a sample rate increaser 504 (only used with sampled signaling), a signed summer 506, through a loop filter 508, and on as an FM output to recognizer-controller 28. A loop comprised of delayer 512, a subtracter 514, and a phase roll over detector 516 is disposed after the sample rate increaser 504 and to the signed summer 506. The signed summer 506 output is coupled to recognizer-controller 28 as phase modulation PM output. The FM output signal of filter 508 is also coupled to a summer 518. The summer 518 receives an additional input signal from the phase rollover detector 516, and its own output signal routed through a delayer 520 and back into itself. In addition, the signal delayed by means 520 is input to signed summer 506. The output signal of the summer 518 is coupled to means for performing polar-to-rectangular conversion 524, via a sample rate reducer 522 (only used with sampled signals). Means 524 receives an additional input signal M, from means 502 via delay means 526. The delayed M is output to recognizer-controller 28 as amplitude modulation AM output. The demodulator 104, is shown processing sampled signals, although the approach applies equally well to continuous signals (no sample rate adjustment 504, 522 used). For sampled signals, the rate adjust value R is typically two, but may be more or less.

Figure 6:
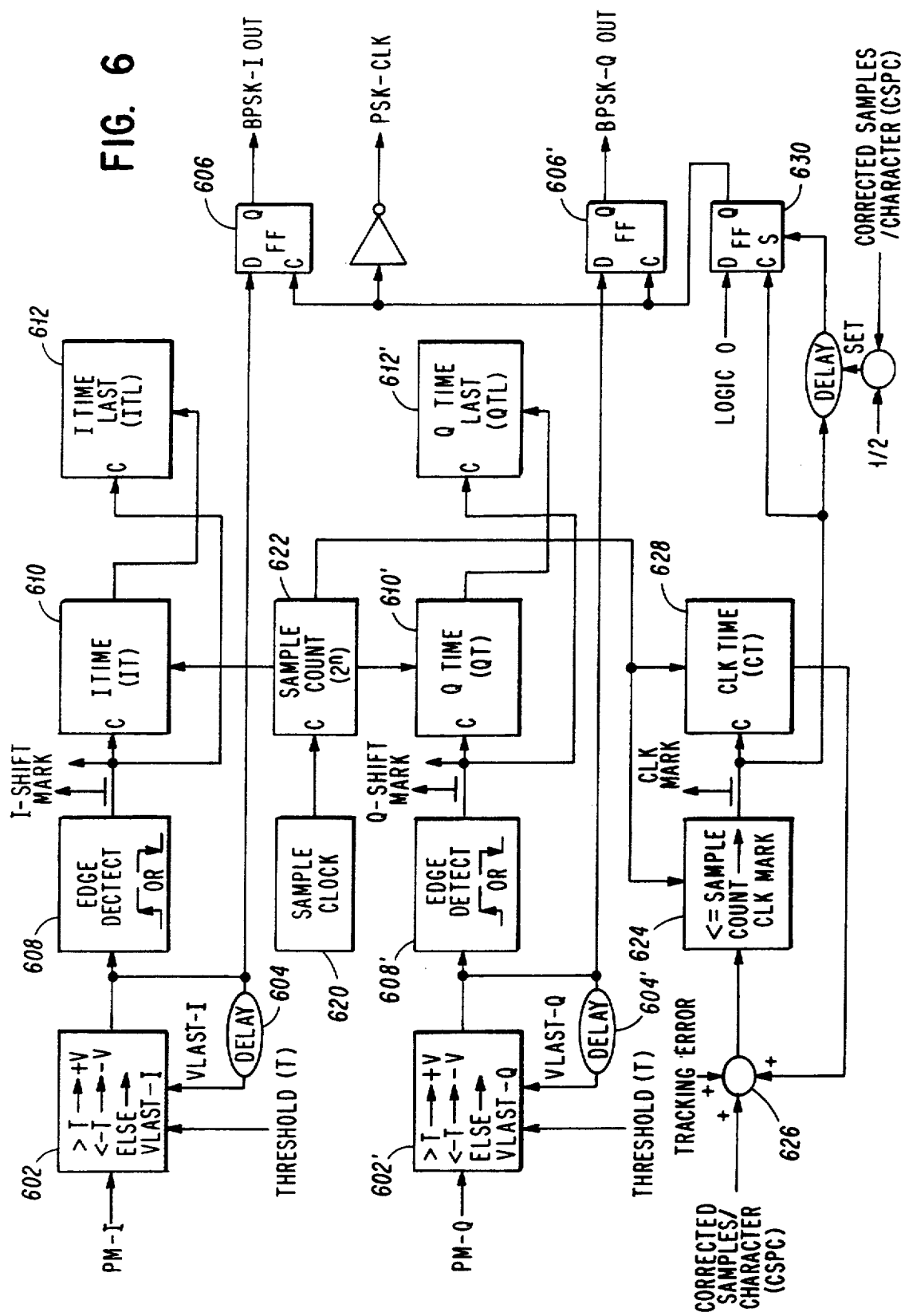
FIG. 6 is a block diagram of one implementation of the timing and phase correction means detector section of the apparatus of FIG. 1.

If a desired signal is a phase modulation signal and has been recognized at one of the dual stage demodulators, the detected PM-X outputs are used to recover both character data, as well as timing and phase correction information. FIG. 6 illustrates the PSK data detector section in the timing and phase correction block diagram. Parallel channels for processing the PM-I and PM-Q input signals operate in conjunction with a symbol clock tracking loop to provide PSK output signals. The input PM-I signal is coupled to threshold comparator 602 for determining if the incoming signal exceeds (positively or negatively) a programmed threshold resulting in a binary signal with states $+V$ and $-V$. Should the incoming PM-I signal not exceed the threshold value, the previous binary state, VLAST-I is maintained and coupled to a flip-flop device 606 via delay means 604. Delayer 604 may also be implemented by other binary state memory device means. Should the input PM-I signal exceed the threshold value, the binary state value is routed to a state change detector 608 that generates an I-shift mark upon detection of a phase shift, and stores the time of the mark (IT) in a register 610. The register 610 is coupled to a second register 612 which maintains the previous time of the I-shift mark (ITL). A clock 620 generates a clock signal C routed to sample counter means 622. The sample counter means 622 supplies a sequence of time samples to register 610 and elsewhere as shown. Comparator 624 compares the current time sample from counter 622 with a second input from a summer 626 which combines a tracking error value and a corrected samples/character value, both of which are to be described in more detail later herein. Comparator 624 generates a clock mark CLK MARK that in turn is coupled to a register 628, and on to a flip-flop device 630 as shown. Register 628 stores the current time sample (CT) for each CLK MARK which in turn is combined at summer 626. The flip-flop device 630 is clocked to a Logic 0 state by the CLKMARK and set to Logic 1 at a time later equal to one half the corrected samples/character value, thus generating a rising edge clocking signal for the flip-flop device 606. The PM-Q signal is processed in a similar manner to the above described PM-I processing with the use of similar components, as depicted in FIG. 6.

In operation, the detector of FIG. 6 compares the PM channel signals to a hysteresis threshold ($\pm T$) to determine detected symbol state changes. The detected symbol states are resampled by a recovered data clock to remove variations in symbol widths and channel-to-channel skew. The recovered clock is formed using a clock time store (sample count of the last clock mark). The number of corrected samples per character value is added to the clock time along with a tracking error term and then compared to the ongoing time sample. When the time sample equals or exceeds the sum, a new clock mark is generated, indicating the optimum character state change time. Half a character period later, the detected channel states are resampled to form the two bit parallel character outputs (BPSK-I, BPSK-Q). Detected channel state changes generate channel shift mark(s) in the respective channel(s) with the state change, which are used to record the current and prior time samples when shift is detected. The I and Q times (IT, ITL, QT, QTL) and the CLK Time (CT) are used to establish a unified correction algorithm for local carrier phase tracking, character length tracking, and sample clock tracking.

FIG. 7 illustrates the error process section of the timing and phase correction block diagram implemented in block 32 of FIG. 1. The I-shift mark (see FIG. 6) is coupled to and activates three correction process blocks 702, 704, 706. The three correction process blocks also receive input signals IT, QT, CSPC, ITL, and CT, as depicted, and yield correction terms COR-IQ, COR-II and COR-IC. Similarly, the Q-shift mark is coupled to and activates three correction process blocks 730, 732, 734, and yield correction terms COR-QI, COR-QQ and COR-QC. A signed summer 708 adds COR-IQ, COR-II while subtracting COR-QI and COR-QQ, along with the last correction value COR-LAST, filters the combined signal and couples the resultant net-time-correction value, NTC, to the phase offset correction means 20 of FIG. 1. The processes as shown in each of the correction process blocks are based upon examining current and past channel state change (phase shift) times, as well as the local (predicted) state change time, on a modulo character rate basis. By using both current and past state change times, an update time correction (NTC) can be made if either or both channel shift marks occur, which is consistent for both channels. Since the I, Q, and CLK times are finite resolution register based (n bits), special rollover provisions are as follows:

If (IT-ITL), (IT-QT), (QT-QTL) or (QT-IT)<0, ADD $2^n$. If (IT-CT) or (QT-CT)>$2^n$/2, SUBTRACT $2^n$; <=$(2^n)$/2, ADD $2^n$.

All of the processing shown is at the character rate except for the resampled net time-correction, which smooths the input phase tracking. The net time correction output is only enabled to process BPSK, QPSK, or OQPSK data. AM, FM, ASK, and FSK signals are processed with NTC off. Coupling the COR-II and COR-QQ terms (i.e. time correspondence between current and prior channel state changes) through scaling 714, 714' and average filtering 716, 716' produces character length error terms which are added 718 with the nominal character length to produce the corrected samples/character (CSPC) term. Combining the COR-IC and COR-QC terms (i.e. time correspondence between current channel state changes and local state change time) in adder 736 and scaling by a tracking gain term 740 produces a tracking error term which is used to correct time offsets in the local state change time CT (see FIG. 6). The PSK clock sync status is used as a "flag" to recognizer/controller 28 (see FIG. 1) to indicate that PSK data is in character rate tracking with the local shift time reference. When offset QPSK signals are processed the timing tracks at twice the character rate, but the character rate filters (see FIG. 4) remain at the character length.

Those skilled in the art will readily recognize that various modifications and changes may be made to the present invention without departing from the true spirit and scope thereof, which is set forth in the following claims.

I claim:

1. A receiver apparatus for processing radio frequency signals and suppressing co-channel interference and multi-path distortion comprising:
   a phase offset remover;
   a plurality set of demodulators cascadely coupled to the phase offset remover;
   a first switch having an output signal that represents a desired demodulated analog portion of an input signal, and a second switch, coupled to a timing and phase correction circuit and a data processor, each switch coupled to the demodulators;
   a recognizer-controller coupled to the plurality set of demodulators for receiving an output signal each demodulator and also coupled each switch thereby providing a control signal to said switch;
   said timing and phase correction circuit coupled to the phase offset remover, and to the recognizer-controller; and
   said data processor coupled to the recognizer-controller;
   wherein an input signal having a desired component, co-channel noise and interference, is coupled to the phase offset remover and the recognizer-controller so that the desired component signal is recognized and separated by the recognizer-controller from co-channel noise and interference, and demodulated by the plurality set of demodulators with enhanced suppression of noise and interference.

2. The apparatus of claim 1 wherein the phase offset remover is comprised of a phase shifter and time-error-to-phase error circuitry.

3. The apparatus of claim 1 wherein the plurality set of demodulators is comprised of a plurality N of demodulator stages, where N is defined as the total number of co-channel signals, interference or noise to be processed.

4. The apparatus of claim 3 wherein each demodulator stage is cascadely coupled to all other demodulator stages.

5. The apparatus of claim 4 wherein each demodulator stage is paired with delayers so that subsequent demodulator stages are synchronized with earlier demodulator stages.

6. The apparatus of claim 1 wherein the plurality set of demodulators is comprised of a plurality of demodulator stages equal to the total number of co-channel signals, interference and noise to be processed, multiplied by the number of cascaded groups of demodulators, if more than one group.

7. The apparatus of claim 3 wherein the demodulator stages consist of a combination of dual phase-locked loop stages and single phase-locked loop stages, and at least two of the demodulator stages are dual phase-locked loop stages in order to separately accommodate the in-phase and quadrature-phase components of an input signal.

8. The apparatus of claim 3 wherein the timing-and-phase corrector provides a desired demodulated phase-shift key data portion of the input signal.

9. The apparatus of claim 3 wherein an auxiliary data processor coupled to the recognizer-controller provides a desired demodulated frequency-shift key data portion, or amplitude shift key data portion, of the input signal.

* * * * *